US012712430B2

(12) United States Patent
Chen et al.

(10) Patent No.: US 12,712,430 B2
(45) Date of Patent: Aug. 18, 2026

(54) SWITCHING CONVERTER WITH SELECTABLE VOLTAGE SAMPLING PATHS AND ASSOCIATED CONTROL CIRCUIT AND CONTROL METHOD

(71) Applicant: Chengdu Monolithic Power Systems Co., Ltd., Chengdu (CN)

(72) Inventors: Xuefeng Chen, Hangzhou (CN); Yuting Zhou, Hangzhou (CN)

(73) Assignee: Chengdu Monolithic Power Systems Co., Ltd., Chengdu (CN)

(*) Notice: Subject to any disclaimer, the term of this patent is extended or adjusted under 35 U.S.C. 154(b) by 155 days.

(21) Appl. No.: 18/896,327

(22) Filed: Sep. 25, 2024

(65) Prior Publication Data

US 2025/0105722 A1 Mar. 27, 2025

(30) Foreign Application Priority Data

Sep. 26, 2023 (CN) ......................... 202311248730.9

(51) Int. Cl.

| | |
|---|---|
| ***H02M 1/00*** | (2007.01) |
| ***H02M 1/32*** | (2007.01) |
| ***H02M 3/335*** | (2006.01) |
| ***H02M 7/217*** | (2006.01) |

(52) U.S. Cl.

CPC ....... *H02M 1/0067* (2021.05); *H02M 1/0022* (2021.05); *H02M 1/32* (2013.01); *H02M 3/33507* (2013.01); *H02M 7/217* (2013.01)

(58) Field of Classification Search

CPC .. H02M 1/0022; H02M 1/0067; H02M 1/007; H02M 1/0095; H02M 1/32; H02M 1/322; H02M 1/4225; H02M 3/00; H02M 3/24; H02M 3/33507; H02M 3/33523; H02M 7/04; H02M 7/06; H02M 7/217

See application file for complete search history.

(56) References Cited

U.S. PATENT DOCUMENTS

| | | | | |
|---|---|---|---|---|
| 9,148,049 | B2 | 9/2015 | Li | |
| 9,276,459 | B2 * | 3/2016 | Wu | H02M 3/335 |
| 9,385,616 | B2 * | 7/2016 | Deng | H05B 45/385 |
| 9,831,773 | B2 * | 11/2017 | Polhemus | G01R 19/003 |
| 9,997,994 | B1 * | 6/2018 | Luo | H02M 3/33546 |
| 2015/0069924 | A1 * | 3/2015 | Deng | H02M 1/4258 363/21.09 |
| 2017/0179824 | A1 * | 6/2017 | Polhemus | G01R 19/0092 |
| 2024/0055983 | A1 * | 2/2024 | Liu | H02M 1/4208 |

* cited by examiner

*Primary Examiner* — Raymond R Chai

(74) *Attorney, Agent, or Firm* — Ashurst Perkins Coie US LLP

(57) ABSTRACT

An integrated circuit control device for a switching converter with a pre-stage circuit and a post-stage circuit is provided. The pre-stage circuit converts an AC input voltage to a first output voltage. The post-stage circuit converts the first output voltage to a second output voltage. The integrated circuit control device includes a first pin, a discharge circuit and a switching control circuit. The first pin receives a voltage sampling signal. The first pin is coupled to a first sampling path sampling a first voltage signal indicating the AC input voltage and coupled to a second sampling path sampling a second voltage signal indicating the first output voltage. The discharge circuit and the switching control circuit receive the voltage sampling signal through the first pin and control the switching converter based on the voltage sampling signal.

20 Claims, 10 Drawing Sheets

SWITCHING CONVERTER WITH SELECTABLE VOLTAGE SAMPLING PATHS AND ASSOCIATED CONTROL CIRCUIT AND CONTROL METHOD

CROSS-REFERENCE TO RELATED APPLICATIONS

This application claims the benefit of CN application No. 202311248730.9, filed on Sep. 26, 2023, and incorporated herein by reference.

TECHNICAL FIELD

The present invention generally relates to electronic circuits, and more particularly but not exclusively, to control circuits for switching converters and associated control methods.

BACKGROUND

FIG. 1 shows a schematic diagram of a conventional switching converter 100. As shown in FIG. 1, a safety capacitor XCAP is coupled between two input terminals of the switching converter 100. A rectifier bridge having diodes D1~D4 and a capacitor C1 converts an AC input voltage Vac to a voltage VREC. A switching circuit 10 is coupled to an output terminal of the rectifier bridge to convert the voltage VREC to an output voltage Vout. A sampling circuit 11 having diodes D6~D7 and a resistor R1 is coupled between the two input terminals of the switching converter 100. The sampling circuit 11 detects the AC input voltage Vac and provides a sampling signal Vs indicating the AC input voltage Vac. An integrated circuit control device 30 receives the sampling signal Vs through a pin HV and controls the discharge of the safety capacitor XCAP and the operation of the switching circuit 10 based on the sampling signal Vs.

SUMMARY

An embodiment of the present invention discloses an integrated circuit control device for a switching converter with a pre-stage circuit and a post-stage circuit. The pre-stage circuit converts an AC input voltage to a first output voltage. The post-stage circuit converts the first output voltage to a second output voltage. The integrated circuit control device includes a first pin, a discharge circuit and a switching control circuit. The first pin receives a voltage sampling signal. The first pin is coupled to a first sampling path and a second sampling path. The first sampling path samples a first voltage signal indicating the AC input voltage. The second sampling path samples a second voltage signal indicating the first output voltage. The discharge circuit receives the voltage sampling signal through the first pin and detects whether two input terminals of the switching converter are disconnected from the AC input voltage based on the voltage sampling signal. The switching control circuit receives the voltage sampling signal through the first pin and provides a switching control signal to control the post-stage circuit for regulating the second output voltage based on the voltage sampling signal.

Another embodiment of the present invention discloses a switching converter. The switching converter includes a pre-stage circuit, a post-stage circuit and an integrated circuit control device. The pre-stage circuit receives an AC input voltage and converts the AC input voltage to a first output voltage. The post-stage circuit receives the first output voltage and converts the first output voltage to a second output voltage. The integrated circuit control device includes a first pin, a discharge circuit and a switching control circuit. The first pin receives a voltage sampling signal. The first pin is coupled to a first sampling path and a second sampling path. The first sampling path samples a first voltage signal indicating the AC input voltage. The second sampling path samples a second voltage signal indicating the first output voltage. The discharge circuit receives the voltage sampling signal through the first pin and detects whether two input terminals of the switching converter are disconnected from the AC input voltage based on the voltage sampling signal. The switching control circuit receives the voltage sampling signal through the first pin and provides a switching control signal to control the post-stage circuit for regulating the second output voltage based on the voltage sampling signal.

Yet another embodiment of the present invention discloses a control method for a switching converter with a pre-stage circuit and a post-stage circuit. The pre-stage circuit converts an AC input voltage to a first output voltage. The post-stage circuit converts the first output voltage to a second output voltage. The control method has the following steps. A first voltage signal indicating the AC input voltage is received. A second voltage signal indicating the first output voltage is received. A voltage sampling signal is provided to a first pin by sampling the first voltage signal with a first sampling path or sampling the second voltage signal with a second sampling path. The voltage sampling signal is received through the first pin and a switching control signal is provided to control the post-stage circuit for regulating the second output voltage based on the voltage sampling signal. The voltage sampling signal is received through the first pin and whether two input terminals of the switching converter are disconnected from the AC input voltage is detected based on the voltage sampling signal.

BRIEF DESCRIPTION OF DRAWINGS

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element.

Figure 1:
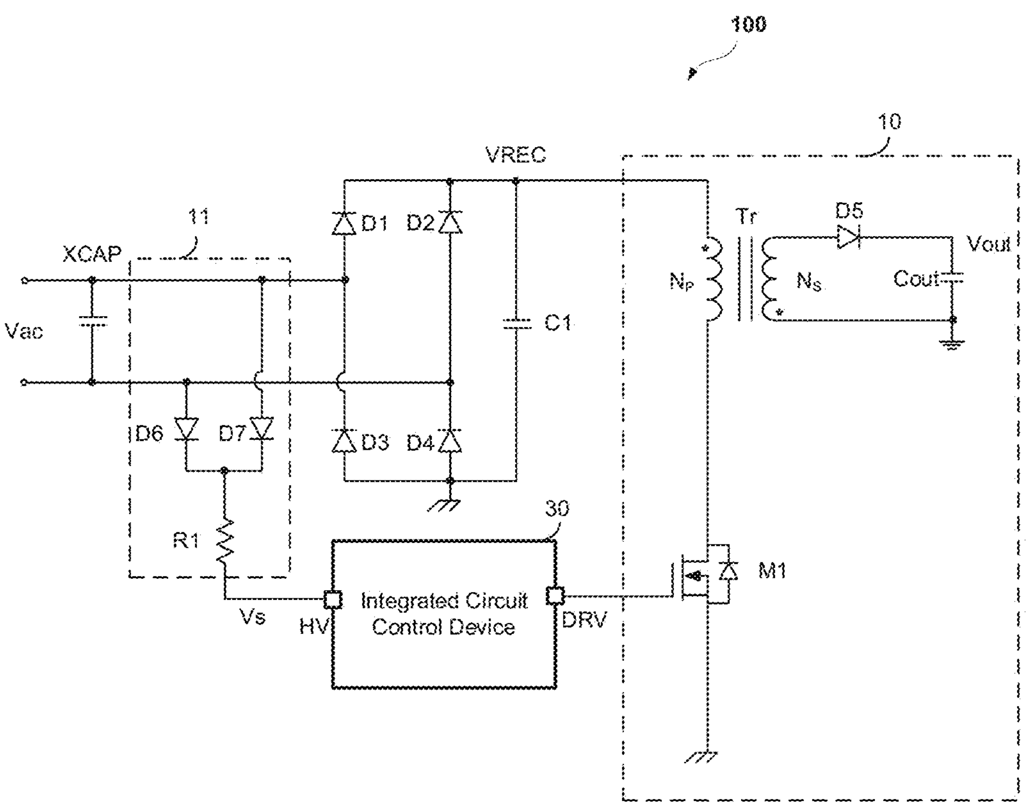
FIG. 1 shows a schematic diagram of a conventional switching converter 100.

In high power applications, it is common to add a switching circuit between the rectifier bridge and the switching circuit 10 for converting the voltage VREC to a higher voltage Vbus. The switching circuit 10 uses the voltage Vbus as an input voltage to generate the output voltage Vout to meet load requirements. However, in this case, the sampling circuit 11 shown in FIG. 1 is unable to detect the voltage Vbus. In other words, the pin HV coupled to an output terminal of the sampling circuit 11 is unable to detect the voltage Vbus, which results in the inability to realize some functions in the integrated circuit control device 30. For example, the integrated circuit control device 30 is unable to provide a switching control signal for controlling the operation of the switching circuit 10 based on the voltage Vbus. One solution is to add a Vbus sampling pin in the integrated circuit control device 30. The Vbus sampling pin is coupled to a Vbus sampling circuit to detect the voltage Vbus. However, this solution requires the additional pin, which definitely increases the cost and hinders the further miniaturization of the integrated circuit control device 30.

Figure 2:
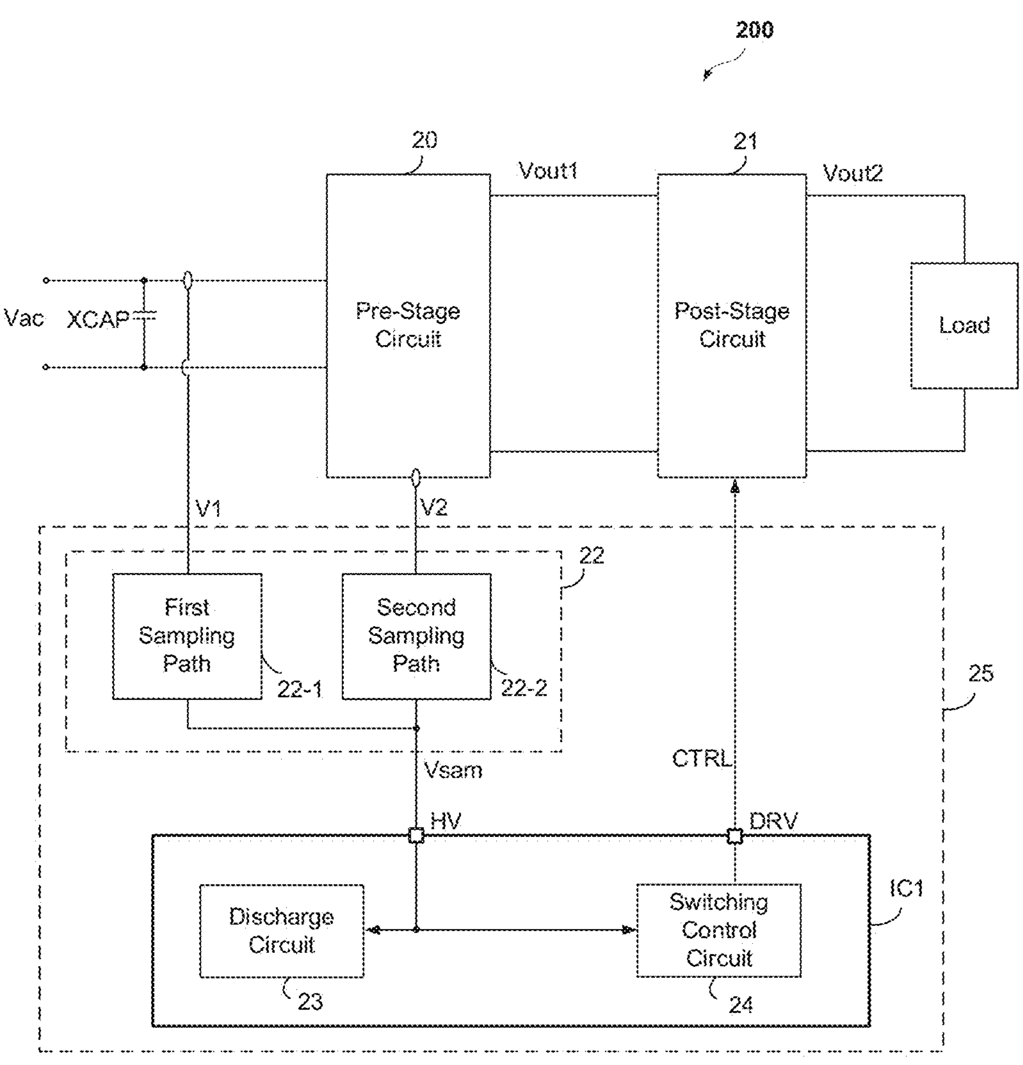
FIG. 2 shows a block circuit diagram of a switching converter 200 in accordance with an embodiment of the present invention.

FIG. 2 shows a block circuit diagram of a switching converter 200 in accordance with an embodiment of the present invention. As shown in FIG. 2, the switching converter 200 includes a safety capacitor XCAP, a pre-stage circuit 20, a post-stage circuit 21 and a control circuit 25. The switching converter 200 has two input terminals coupled to receive an AC input voltage Vac. The safety capacitor XCAP is coupled between the two input terminals of the switching converter 200. In one embodiment, the safety capacitor XCAP includes one or more capacitors. The pre-stage circuit 20 is coupled between the two input terminals of the switching converter 200 to receive the AC input voltage Vac. The pre-stage circuit 20 includes a power switch. The pre-stage circuit 20 converts the AC input voltage Vac between the two input terminals of the switching converter 200 to a first output voltage Vout1 by turning on and off the power switch. The post-stage circuit 21 is coupled to an output terminal of the pre-stage circuit 20 to receive the first output voltage Vout1. The post-stage circuit 21 converts the first output voltage Vout1 to a second output voltage Vout2 to power a load.

The control circuit 25 includes a voltage sampling circuit 22, a discharge circuit 23 and a switching control circuit 24. The voltage sampling circuit 22 has a first input terminal, a second input terminal and an output terminal. The first input terminal receives a first voltage signal V1 indicating the AC input voltage Vac. The second input terminal receives a second voltage signal V2 having information of the first output voltage Vout1. The voltage sampling circuit 22 provides a voltage sampling signal Vsam at the output terminal based on the first voltage signal V1 or based on the second voltage signal V2. In one embodiment, the first voltage signal V1 indicates positive half-cycles of the AC input voltage Vac, a peak value of the second voltage signal V2 indicates the first output voltage Vout1. In one embodiment, the second voltage signal V2 is a voltage across the power switch of the pre-stage circuit 20.

In the embodiment shown in FIG. 2, the voltage sampling circuit 22 includes a first sampling path 22-1 and a second sampling path 22-2. As shown in FIG. 2, the first sampling path 22-1 has a first terminal and a second terminal. The first terminal of the first sampling path 22-1 is coupled to the input terminal of the switching converter 200 to receive the first voltage signal V1. The second terminal of the first sampling path 22-1 is coupled to a common node. The second sampling path 22-2 has a first terminal and a second terminal. The first terminal of the second sampling path 22-2 is coupled to the pre-stage circuit 20 to receive the second voltage signal V2. The second terminal of the second sampling path 22-2 is coupled to the common node. That is to say, the common node is a connection node of the second terminal of the first sampling path 22-1 and the second terminal of the second sampling path 22-2.

In one embodiment, the voltage sampling circuit 22 selects the first sampling path 22-1 or the second sampling path 22-2 to provide the voltage sampling signal Vsam by comparing a threshold voltage Vth with a difference between the second voltage signal V2 and the first voltage signal V1. In a further embodiment, when the difference between the second voltage signal V2 and the first voltage signal V1 is higher than the threshold voltage Vth, the voltage sampling signal Vsam is provided by sampling the second voltage signal V2 with the second sampling path 22-2. When the difference between the second voltage signal V2 and the first voltage signal V1 is lower than the threshold voltage Vth, the voltage sampling signal Vsam is provided by sampling the first voltage signal V1 with the first sampling path 22-1.

In the embodiment shown in FIG. 2, the discharge circuit 23 and the switching control circuit 24 are integrated in an integrated circuit control device IC1. The integrated circuit control device IC1 has a plurality of pins. The plurality of pins includes a pin HV and a pin DRV. The pin HV is coupled to the common node to receive the voltage sampling signal Vsam. The pin DRV provides a switching control signal CTRL to control the post-stage circuit 21. In one embodiment, the voltage sampling circuit 22 and the integrated circuit control device IC1 are packaged in a same module.

The discharge circuit 23 receives the voltage sampling signal Vsam through the pin HV and detects whether the two input terminals of the switching converter 200 are disconnected from the AC input voltage based on the voltage sampling signal Vsam. The discharge circuit 23 further determines whether to perform a discharge operation on the safety capacitor XCAP based on the detection. In one embodiment, the safety capacitor XCAP is discharged by the discharge circuit 23 when the two input terminals of the switching converter 200 are disconnected from the AC input voltage.

In one embodiment, when the two input terminals of the switching converter 200 are connected to the AC input voltage, the voltage sampling signal Vsam is a pulsed voltage. When the two input terminals of the switching converter 200 are disconnected from the AC input voltage, the voltage sampling signal Vsam is substantially unchanged. It is to be understood that “substantially” is a term of art and is meant to convey the principle that relationship such simultaneity or perfect synchronization cannot be met with exactness, but only within the tolerances of the technology available to a practitioner of the art under discussion. By detecting whether the voltage sampling signal Vsam is the pulsed voltage or substantially unchanged, the discharge circuit 23 determines whether the two input terminals of the switching converter 200 are disconnected from the AC input voltage, so as to determine whether to perform the discharge operation on the safety capacitor XCAP.

The switching control circuit 24 also receives the voltage sampling signal Vsam through the pin HV and provides the switching control signal CTRL to control the post-stage circuit 21 for regulating the second output voltage Vout2 based on the voltage sampling signal Vsam.

In one embodiment, the switching control circuit 24 samples and holds a peak value of the voltage sampling signal Vsam and provides the switching control signal CTRL based on the sample and hold result to control a power switch of the post-stage circuit 21.

Figure 3:
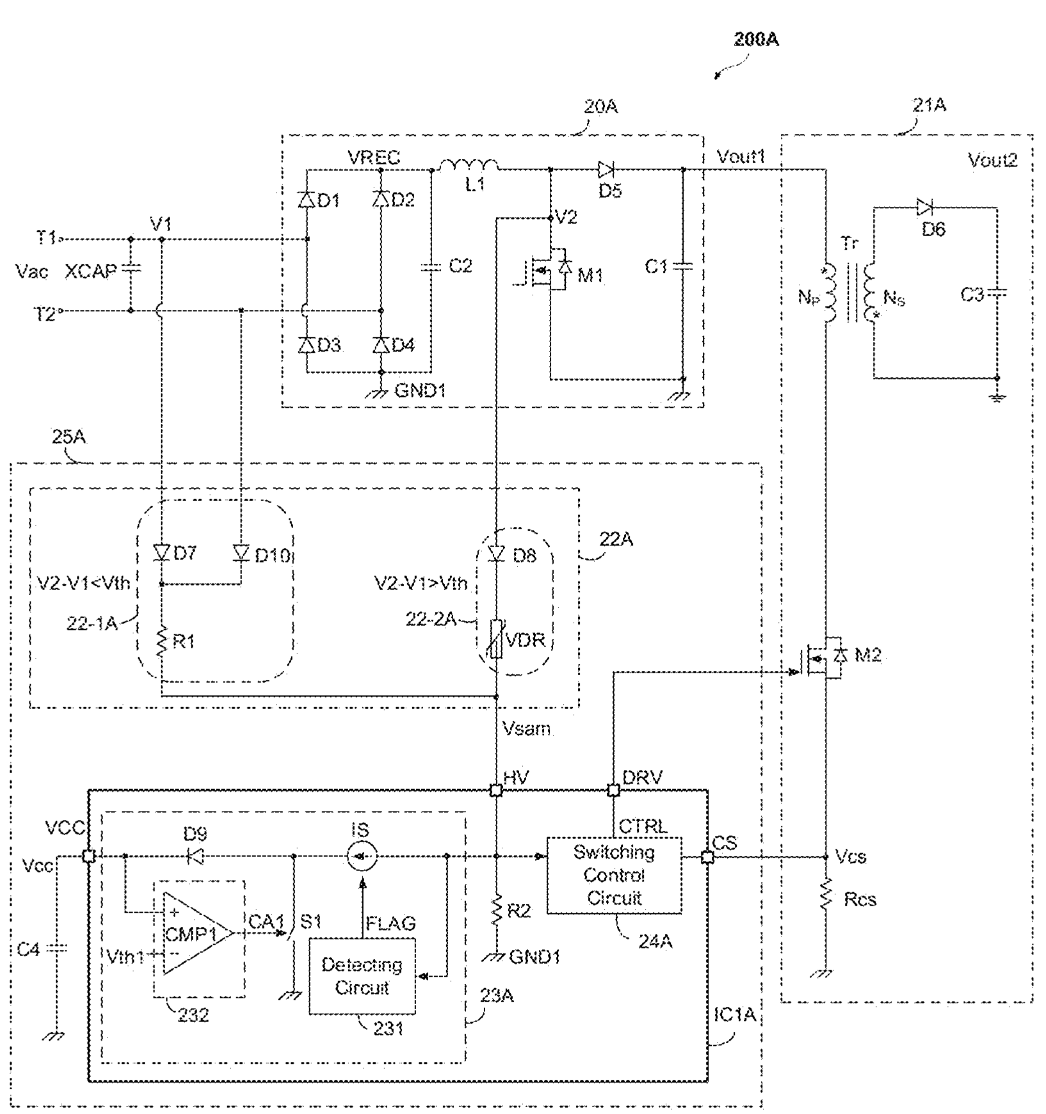
FIG. 3 shows a schematic diagram of a switching converter 200A in accordance with another embodiment of the present invention.

FIG. 3 shows a schematic diagram of a switching converter 200A in accordance with another embodiment of the present invention The switching converter 200A includes the safety capacitor XCAP, a pre-stage circuit 20A, a post-stage circuit 21A and a control circuit 25A. The switching converter 200A has two input terminals (i.e., a first input terminal T1 and a second input terminal T2 as shown in FIG. 3) coupled to receive the AC input voltage Vac. As shown in FIG. 3, the safety capacitor XCAP is coupled between the first input terminal T1 and the second input terminal T2. The pre-stage circuit 20A includes a rectifier bridge and a BOOST circuit. The rectifier bridge includes diodes D1~D4. The BOOST circuit includes an inductor L1, a power switch M1, a diode D5 and a capacitor C1, connected as shown in FIG. 3. The pre-stage circuit 20A is coupled to the first input terminal T1 and the second input terminal T2 to receive the AC input voltage Vac and converts the AC input voltage Vac to the first output voltage Vout1. In one embodiment, the pre-stage circuit 20A further includes a capacitor C2 coupled between an output terminal of the rectifier bridge and a reference ground GND1, for preventing the parasitic capacitance of the rectifier bridge from oscillating with the inductor L1. The post-stage circuit 21A utilizes a Flyback topology, including a transformer Tr, a power switch M2, a diode D6 and a capacitor C3, connected as shown in FIG. 3. The post-stage circuit 21A is coupled to the pre-stage circuit 20A to receive the first output voltage Vout1 and converts the first output voltage Vout1 to the second output voltage Vout2.

The control circuit 25A includes a voltage sampling circuit 22A, a discharge circuit 23A and a switching control circuit 24A. In the embodiment shown in FIG. 3, the discharge circuit 23A and the switching control circuit 24A are integrated in an integrated circuit control device IC1A. The integrated circuit control device IC1A has the pin HV.

The voltage sampling circuit 22A includes a first sampling path 22-1A and a second sampling path 22-2A. The first sampling path 22-1A has a first terminal coupled to the first input terminal T1, a second terminal coupled to the second input terminal T2 and a third terminal coupled to the pin HV. The first sampling path 22-1A is configured to detect the AC input voltage Vac. The second sampling path 22-2A has a first terminal coupled to the power switch M1 and a second terminal coupled to the pin HV. The second sampling path 22-2A is configured to detect the first output voltage Vout1.

In the embodiment shown in FIG. 3, the first sampling path 22-1A includes a unidirectional device D7 and a unidirectional device D10. An input terminal of the unidirectional device D7 is coupled to the first input terminal T1 to receive the first voltage signal V1. An input terminal of the unidirectional device D10 is coupled to the second input terminal T2. An output terminal of the unidirectional device D7 and an output terminal of the unidirectional device D10 are coupled to the pin HV. In one embodiment, the first sampling path 22-1A further includes a resistor R1. The resistor R1 is coupled between the pin HV and a common node formed by the output terminal of the unidirectional device D7 and the output terminal of the unidirectional device D10.

The second sampling path 22-2A includes a unidirectional device D8 coupled in series with a voltage dependent resistor VDR. An input terminal of the unidirectional device D8 is coupled to a common node formed by the inductor L1 and the power switch M1 to receive the second voltage signal V2. A first terminal of the voltage dependent resistor VDR is coupled to an output terminal of the unidirectional device D8. A second terminal of the voltage dependent resistor VDR is coupled to the pin HV. In one embodiment, the unidirectional device D7, the unidirectional device D10 and the unidirectional device D8 include diodes.

When the difference between the second voltage signal V2 and the first voltage signal V1 is higher than the threshold voltage Vth, the second sampling path 22-2A conducts. In other words, both the voltage dependent resistor VDR and the unidirectional device D8 turn on. The voltage sampling circuit 22A provides the voltage sampling signal Vsam by sampling the second voltage signal V2 with the second sampling path 22-2A.

When the difference between the second voltage signal V2 and the first voltage signal V1 is lower than the threshold voltage Vth, the first sampling path 22-1A conducts. In other words, the unidirectional device D7 or the unidirectional device D10 turns on. The voltage sampling circuit 22A provides the voltage sampling signal Vsam by sampling the first voltage signal V1 with the first sampling path 22-1A.

In one embodiment, the two input terminals of the switching converter 200A are connected to the AC input voltage and the pre-stage circuit 20A is under power operation. In this case, the frequency of the first voltage signal V1 is equal to half the frequency f1 of the AC input voltage Vac. The frequency of the second voltage signal V2 is equal to the switching frequency fs of the pre-stage circuit 20A (i.e., the switching frequency of the power switch M1). The frequency of the voltage sampling signal Vsam is equal to the switching frequency fs.

Figure 4A:
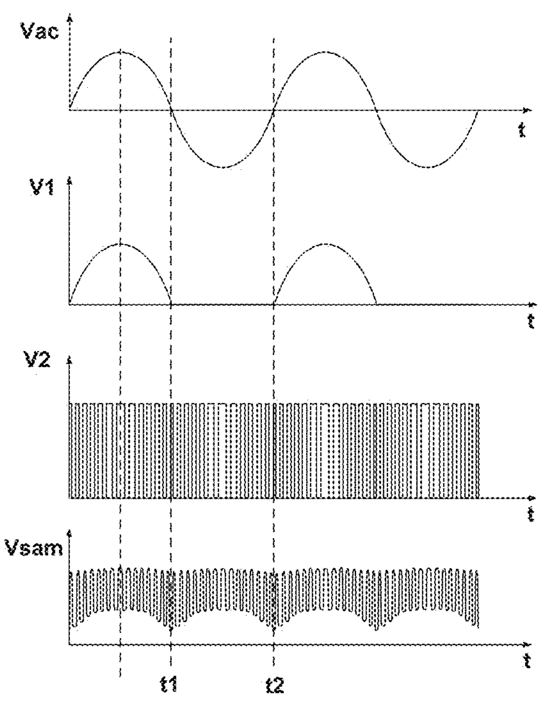
FIGS. 4A-4C show working waveforms of a voltage sampling circuit 22A when a pre-stage circuit 20A is under power operation in accordance with an embodiment of the present invention.
Figure 4B:
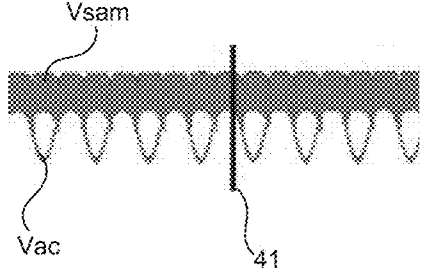
Figure 4C:
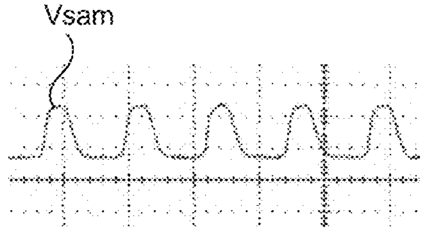

FIGS. 4A~4C show working waveforms of the voltage sampling circuit 22A when the pre-stage circuit 20A is under power operation in accordance with an embodiment of the present invention.

FIG. 4A shows schematic waveforms of the AC input voltage Vac, the first voltage signal V1, the second voltage signal V2 and the voltage sampling signal Vsam. FIGS. 4B and 4C show experimental waveforms of the AC input voltage Vac and the voltage sampling signal Vsam, FIG. 4C shows a zoomed-in waveform of a region 41 in FIG. 4B.

In another embodiment, the two input terminals of the switching converter 200A are connected to the AC input voltage and the pre-stage circuit 20A is not under power operation. In this case, the frequency of the first voltage signal V1 is equal to half the frequency f1 of the AC input voltage Vac, the second voltage signal V2 is substantially unchanged. The frequency of the voltage sampling signal Vsam is equal to the frequency f1 of the AC input voltage Vac.

Figure 5A:
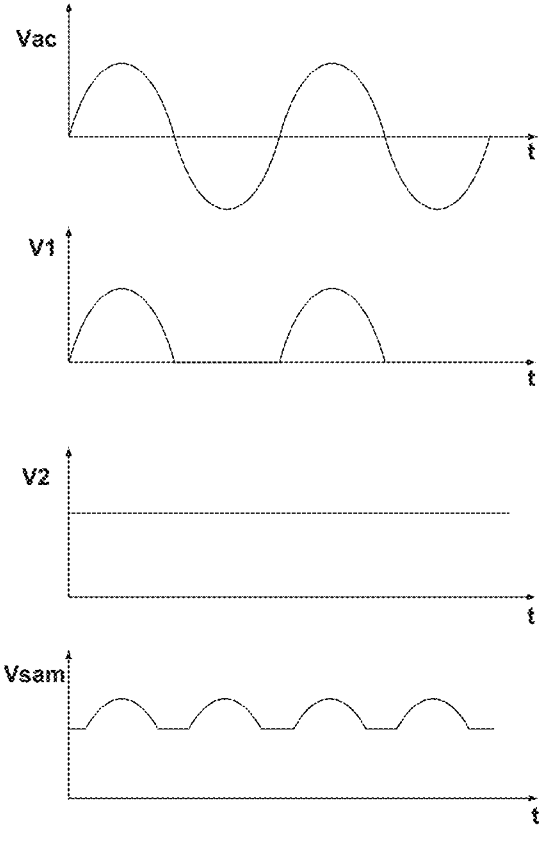
FIGS. 5A-5B show working waveforms of the voltage sampling circuit 22A when the pre-stage circuit 20A is not under power operation in accordance with another embodiment of the present invention.
Figure 5B:
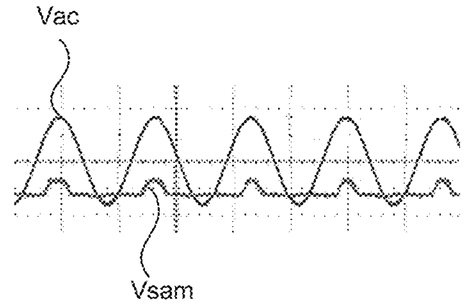

FIGS. 5A~5B show working waveforms of the voltage sampling circuit 22A when the pre-stage circuit 20A is not under power operation in accordance with another embodiment of the present invention. FIG. 5A shows schematic waveforms of the AC input voltage Vac, the first voltage signal V1, the second voltage signal V2 and the voltage sampling signal Vsam. FIG. 5B shows experimental waveforms of the AC input voltage Vac and the voltage sampling signal Vsam.

In yet another embodiment, the two input terminals of the switching converter 200A are disconnected from the AC input voltage. In this case, both the first voltage signal V1 and the second voltage signal V2 are substantially unchanged. The voltage sampling signal Vsam is also substantially unchanged.

In one embodiment, the discharge circuit 23A could receive the voltage sampling signal Vsam through the pin HV regardless of whether the pre-stage circuit 20A is under power operation. The discharge circuit 23A detects whether the two input terminals of the switching converter 200A are disconnected from the AC input voltage based on the voltage sampling signal Vsam, so as to determine whether to perform the discharge operation on the safety capacitor XCAP. Also, the peak value of the voltage sampling signal Vsam indicates the first output voltage Vout1 when the pre-stage circuit 20A is under power operation. Thus, the switching control circuit 24A could receive the voltage sampling signal Vsam through the pin HV to obtain the information of the first output voltage Vout1 and provide the switching control signal CTRL to control the post-stage circuit 21A. In other words, in the embodiment, an additional pin for detecting the first output voltage Vout1 is omitted, thereby reducing the cost and the size of the integrated circuit control device IC1A.

Still referring to FIG. 3, in the embodiment shown in FIG. 3, the integrated circuit control device IC1A further includes a pin VCC, a pin DRV and a pin CS. A power supply capacitor C4 is coupled to the pin VCC and provides a power supply voltage Vcc to power the integrated circuit control device IC1A. The pin DRV provides the switching control signal CTRL to control the power switch M2 of the post-stage circuit 21A. The pin CS is coupled to the post-stage circuit 21A to receive a current sense signal Vcs indicating a current flowing through the power switch M2 of the post-stage circuit 21A. In the embodiment shown in FIG. 3, the integrated circuit control device IC1A further includes a resistor R2 coupled between the pin HV and the reference ground GND1.

The discharge circuit 23A includes a detecting circuit 231 and a current source IS. The detecting circuit 231 receives the voltage sampling signal Vsam through the pin HV, detects whether the two input terminals of the switching converter 200A are disconnected from the AC input voltage based on the voltage sampling signal Vsam and generates a flag signal FLAG.

As shown in FIG. 3 the current source IS has a first terminal and a second terminal. The first terminal of the current source IS is coupled to the safety capacitor XCAP through the pin HV, the second terminal of the current source IS is coupled to the power supply capacitor C4. When the flag signal FLAG indicates that the two input terminals of the switching converter 200A are disconnected from the AC input voltage, the current source IS is turned on by the discharge circuit 23A. Therefore, energy stored in the safety capacitor XCAP is recycled and transferred to the power supply capacitor C4 through the current source IS.

The discharge circuit 23A further includes a first comparing circuit 232, a switch S1 and a unidirectional device D9. The first comparing circuit 232 has a first input terminal, a second input terminal and an output terminal. The first input terminal of the first comparing circuit 232 receives the power supply voltage Vcc. The second input terminal of the first comparing circuit 232 receives a first threshold voltage Vth1. The first comparing circuit 232 compares the power supply voltage Vcc with the first threshold voltage Vth1 and generates a first comparison signal CA1 at the output terminal. The switch S1 has a first terminal, a second terminal and a control terminal. The first terminal of the switch S1 is coupled to the second terminal of the current source IS. The second terminal of the switch S1 is coupled to the reference ground GND1. The control terminal of the switch S1 receives the first comparison signal CA1. When the power supply voltage Vcc is higher than the first threshold voltage Vth1, the switch S1 is turned on, the safety capacitor XCAP is discharged to the reference ground GND1. The unidirectional device D9 has an input terminal and an output terminal. The input terminal of the unidirectional device D9 is coupled to the second terminal of the current source IS. The output terminal of the unidirectional device D9 is coupled to the power supply capacitor C4. The unidirectional device D9 is used for preventing the power supply capacitor C4 from being discharged by the switch S1. In one embodiment, the first comparing circuit 232 includes a comparator CMP1, the unidirectional device D9 includes a diode.

The switching control circuit 24A receives the voltage sampling signal Vsam through the pin HV and provides the switching control signal CTRL based on the voltage sampling signal Vsam and the current sense signal Vcs to control the post-stage circuit 21A. In the embodiment shown in FIG. 3, a resistor Rcs is coupled to the power switch M2 for providing the current sense signal Vcs. The current sense signal Vcs indicates the current flowing through the power switch M2.

Figure 6:
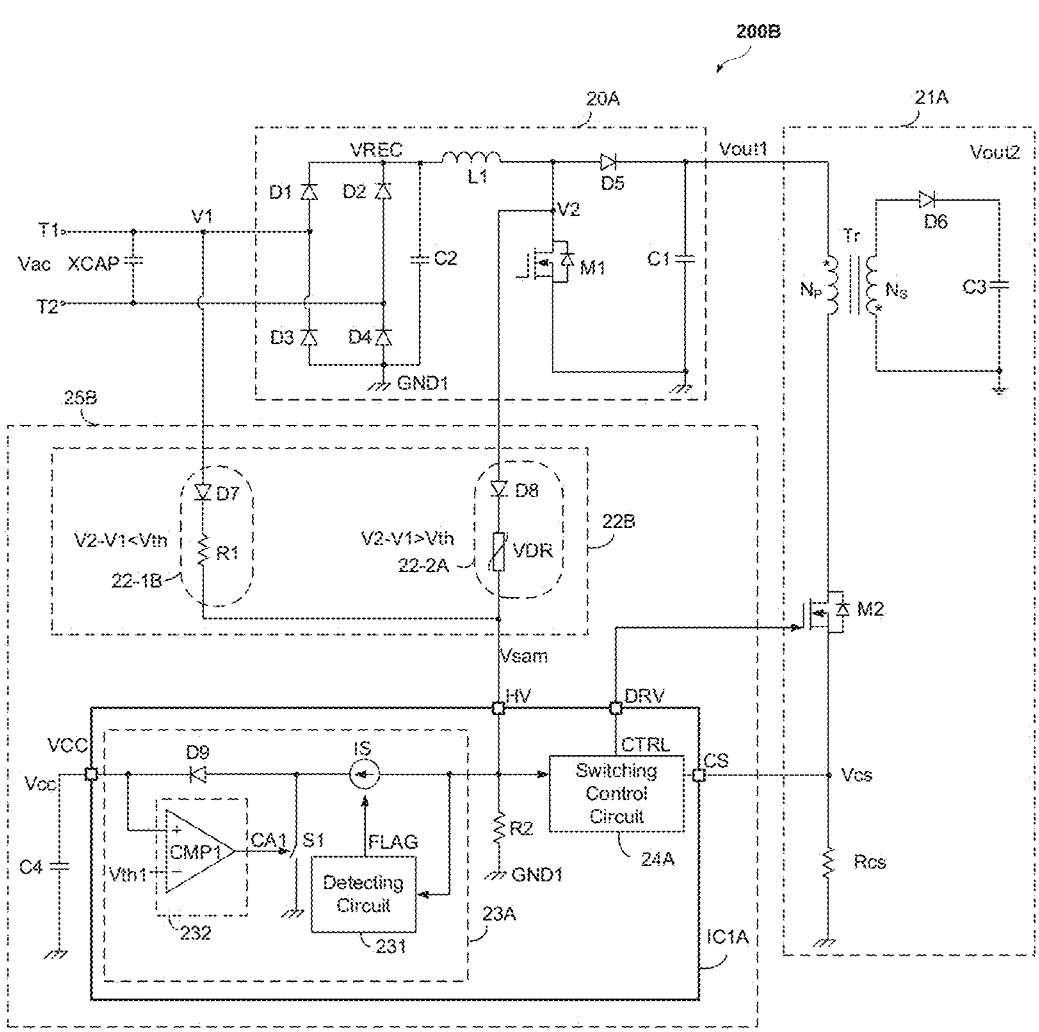
FIG. 6 shows a schematic diagram of a switching converter 200B in accordance with yet another embodiment of the present invention.

FIG. 6 shows a schematic diagram of a switching converter 200B in accordance with yet another embodiment of the present invention. The switching converter 200B shown in FIG. 6 is similar to the switching converter 200A shown in FIG. 3. The difference is that a first sampling path 22-1B of a voltage sampling circuit 22B shown in FIG. 6 includes the unidirectional device D7. The first sampling path 22-1B is configured to detect the AC input voltage Vac. The input terminal of the unidirectional device D7 is coupled to the first input terminal T1. The output terminal of the unidirectional device D7 is coupled to the pin HV. In one embodiment, the first sampling path 22-1B further includes the resistor R1 coupled between the output terminal of the unidirectional device D7 and the pin HV.

In the aforementioned embodiments, the BOOST circuit is shown as an example of the pre-stage circuit and the FLYBACK topology is shown as an example of the post-stage circuit. Persons skilled in the art may understand that these embodiments are only for illustration purpose and are not intended to limit the present invention, other suitable circuit structures may be included within the spirit and scope of the present invention. The voltage sampling circuit may also utilize other suitable circuit structures, as long as the corresponding functions could be realized. In addition, the power switches M1 and M2 of the switching converter may be any controllable semiconductor devices, such as a BJT (Bipolar Junction Transistor), a JFET (Junction Field Effect Transistor), a MOSFET (Metal Oxide Semiconductor Field Effect Transistor), an IGBT (Insulated Gate Bipolar Transistor), a GaN (Gallium Nitride).

Figure 7:
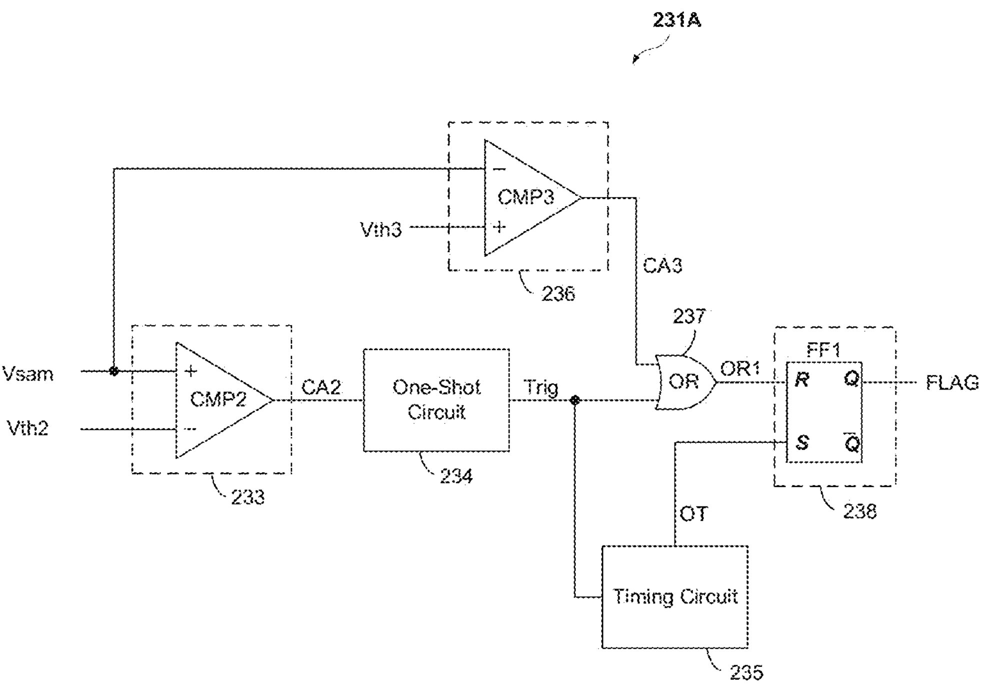
FIG. 7 shows a schematic diagram of a detecting circuit 231A in accordance with an embodiment of the present invention.

FIG. 7 shows a schematic diagram of a detecting circuit 231A in accordance with an embodiment of the present invention. The detecting circuit 231A includes a second comparing circuit 233, a one-shot circuit 234, a timing circuit 235, a third comparing circuit 236, an OR gate circuit 237 and a logic circuit 238.

The second comparing circuit 233 has a first input terminal, a second input terminal and an output terminal. The first input terminal receives the voltage sampling signal Vsam. The second input terminal receives a second threshold voltage Vth2. The second comparing circuit 233 compares the voltage sampling signal Vsam with the second threshold voltage Vth2 and generates a second comparison signal CA2 at the output terminal. In one embodiment, the second comparing circuit 233 includes a comparator CMP2.

The one-shot circuit 234 has an input terminal and an output terminal. The input terminal receives the second comparison signal CA2 and generates a trigger signal Trig based on the second comparison signal CA2. In one embodiment, when the voltage sampling signal Vsam changes from lower into higher than the second threshold voltage Vth2, the one-shot circuit 234 is triggered to generate a short pulse as the trigger signal Trig.

The timing circuit 235 has an input terminal and an output terminal. The input terminal receives the trigger signal Trig. The timing circuit 235 generates a time out signal OT at the output terminal based on the trigger signal Trig and a time threshold Tth. In one embodiment, the time out signal OT changes from low level to high level when a timing duration of the timing circuit 235 reaches the time threshold Tth. The timing circuit 235 is reset when the trigger signal Trig arrives.

The third comparing circuit 236 has a first input terminal, a second input terminal and an output terminal. The first input terminal receives the voltage sampling signal Vsam. The second input terminal receives a third threshold voltage Vth3. The third comparing circuit 236 compares the voltage sampling signal Vsam with the third threshold voltage Vth3 and generates a third comparison signal CA3 at the output terminal. In one embodiment, the third comparing circuit 236 includes a comparator CMP3.

The OR gate circuit 237 has a first input terminal, a second input terminal and an output terminal. The first input terminal receives the trigger signal Trig. The second input terminal receives the third comparison signal CA3. The OR gate circuit 237 performs logical OR operation on the trigger signal Trig and the third comparison signal CA3 to generate an OR signal OR1 at the output terminal.

The logic circuit 238 has a first input terminal, a second input terminal and an output terminal. The first input terminal receives the time out signal OT. The second input terminal receives the OR signal OR1. The output terminal of the logic circuit 238 provides the flag signal FLAG based on the OR signal OR1 and the time out signal OT. In one embodiment, the logic circuit 238 includes a RS flip-flop FF1.

In one embodiment, the detecting circuit 231A shown in FIG. 7 compares the voltage sampling signal Vsam with a plurality of threshold voltages respectively and provides a plurality of comparison results to the one-shot circuit 234. The one-shot circuit 234 generates short pulses based on the plurality of comparison results to reset the timing circuit 235 as well as the logic circuit 238.

Figure 8:
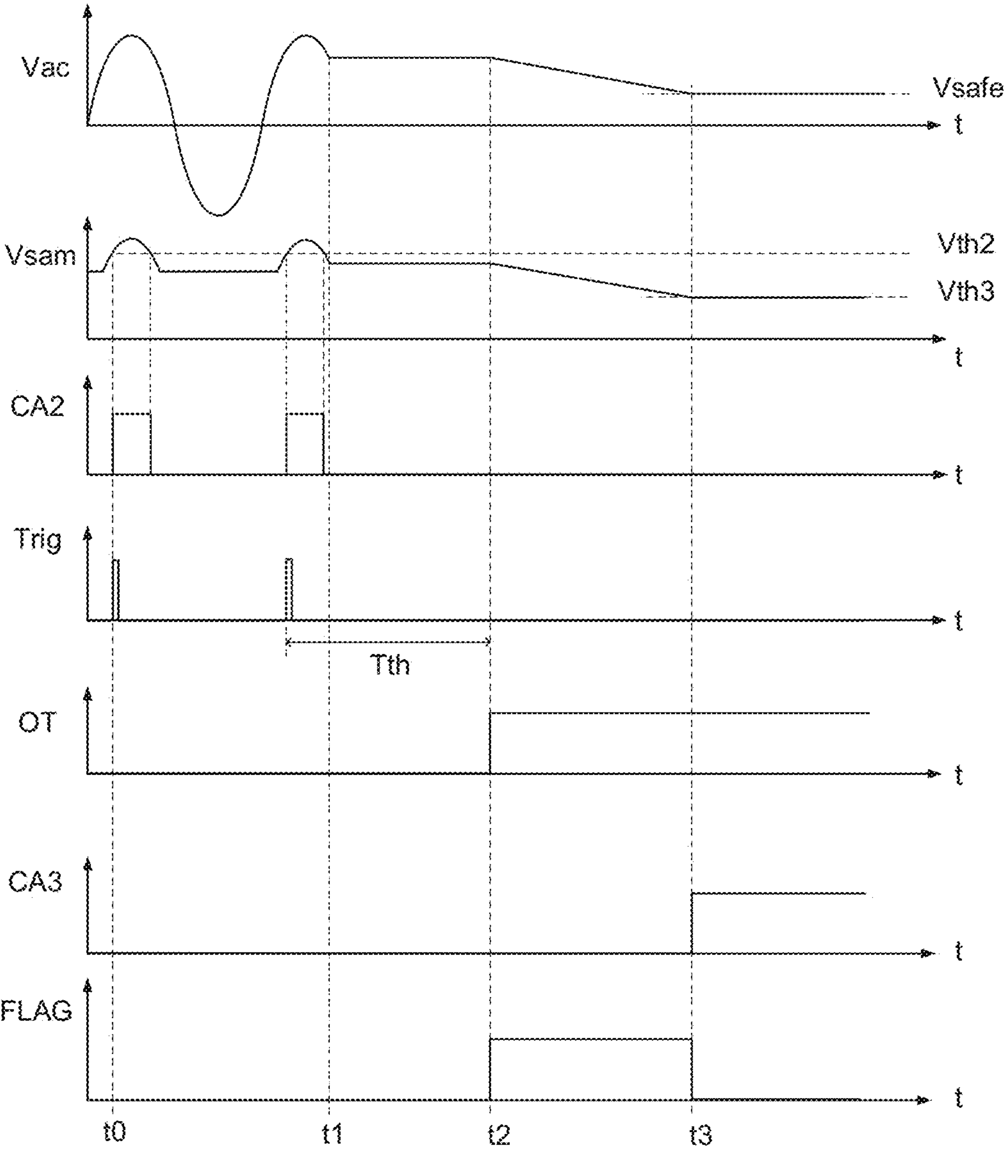
FIG. 8 shows working waveforms of the detecting circuit 231A shown in FIG. 7 in accordance with an embodiment of the present invention.

FIG. 8 shows working waveforms of the detecting circuit 231A shown in FIG. 7 in accordance with an embodiment of the present invention. The working principle of the detecting circuit 231A is described below with reference to FIG. 8. As shown in FIG. 8, before time t1, the two input terminals of the switching converter 200 are connected to the AC input voltage, the voltage sampling signal Vsam is a changed value. Before the timing duration of the timing circuit 235 reaches the time threshold Tth (e.g., at time to shown in FIG. 8), the voltage sampling signal Vsam changes from lower into higher than the second threshold voltage Vth2, the second comparison signal CA2 changes from low level to high level. The one-shot circuit 234 is triggered by the rising edge of the second comparison signal CA2 to generate the short pulse to reset the timing circuit 235 and the logic circuit 238. Before time t1, both of the time out signal OT and the flag signal FLAG are low level.

At time t1, the two input terminals of the switching converter 200 are disconnected from the AC input voltage, the AC input voltage Vac keeps constant since the presence of the safety capacitor XCAP, the voltage sampling signal Vsam also keeps constant.

At time t2, the timing duration of the timing circuit 235 reaches the time threshold Tth, the time out signal OT changes from low level to high level, the logic circuit 238 is set. The flag signal FLAG changes from low level to high level to indicate that the two input terminals of the switching converter 200 are disconnected from the AC input voltage. Then the safety capacitor XCAP is discharged, the AC input voltage Vac decreases gradually, the voltage sampling signal Vsam also decreases gradually.

At time t3, the AC input voltage Vac decreases to a safe threshold voltage Vsafe, the voltage sampling signal Vsam decreases to the third threshold voltage Vth3. The third comparison signal CA3 changes from low level to high level, the logic circuit 238 is reset, the flag signal FLAG changes from high level to low level.

In one embodiment, during time t2~t3, if the two input terminals of the switching converter 200 are re-connected to the AC input voltage, the voltage sampling signal Vsam starts increasing. When the voltage sampling signal Vsam changes from lower into higher than the second threshold voltage Vth2, the second comparison signal CA2 changes from low level to high level, the one-shot circuit 234 is triggered, the logic circuit 238 is reset. The flag signal FLAG changes from high level to low level to indicate that the two input terminals of the switching converter 200 are connected to the AC input voltage. At the same time, the timing circuit 235 is reset, the time out signal OT also changes from high level to low level.

In one embodiment, at time t2, the flag signal FLAG indicates that the two input terminals of the switching converter are disconnected from the AC input voltage, the safety capacitor XCAP is discharged for a first time-duration. After the first time-duration, the safety capacitor XCAP is stopped being discharged, the detecting circuit 231A detects whether the two input terminals of the switching converter 200 are re-connected to the AC input voltage. If the two input terminals of the switching converter 200 are still disconnected from the AC input voltage, the safety capacitor XCAP is discharged for the first time-duration again. After the first time-duration, the safety capacitor XCAP is stopped being discharged again, the detecting circuit 231 detects whether the two input terminals of the switching converter 200 are re-connected to the AC input voltage. The above steps repeat until the AC input voltage Vac is decreased to the safe threshold voltage Vsafe.

Figure 9:
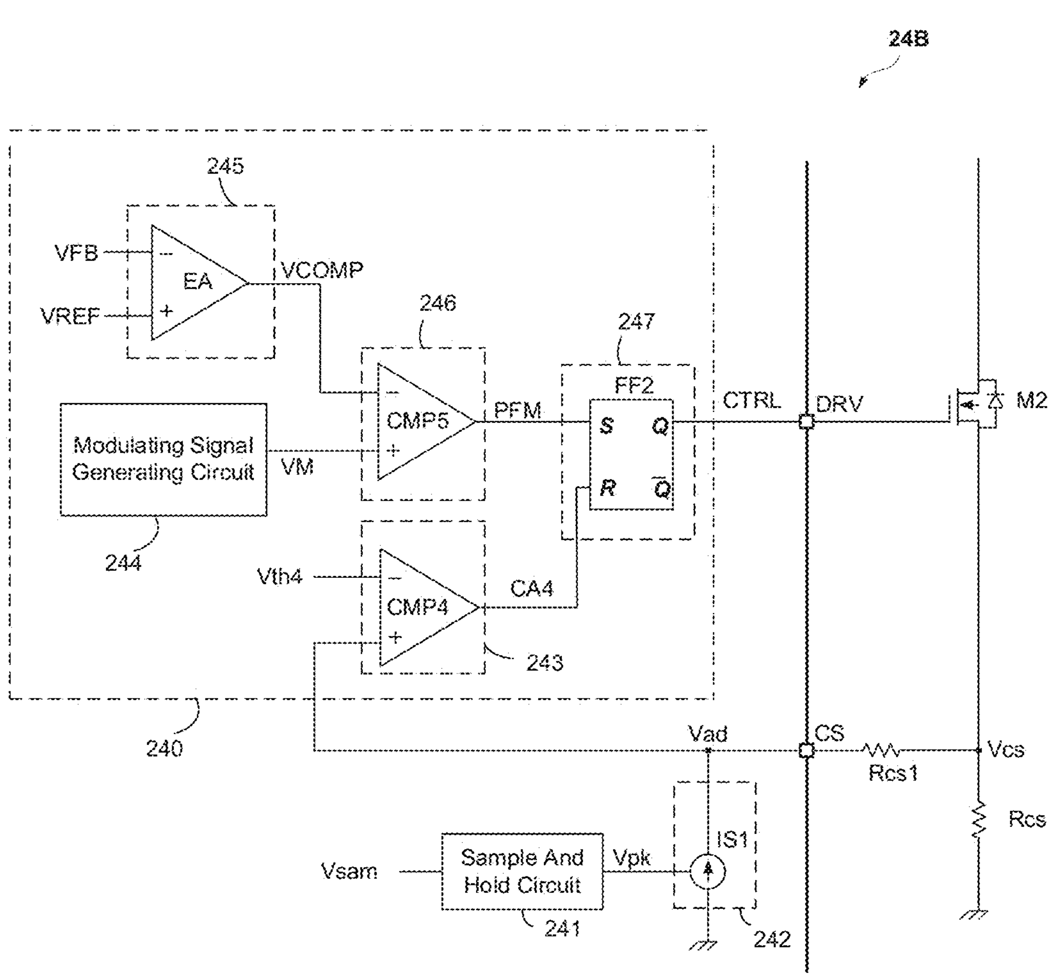
FIG. 9 shows a schematic diagram of a switching control circuit 24B in accordance with an embodiment of the present invention.

FIG. 9 shows a schematic diagram of a switching control circuit 24B in accordance with an embodiment of the present invention. The switching control circuit 24B includes a sample and hold circuit 241, a compensation circuit 242 and a switching control signal generating circuit 240.

The sample and hold circuit 241 receives the voltage sampling signal Vsam, and samples and holds the peak value of the voltage sampling signal Vsam to provide a sample and hold signal Vpk. The sample and hold signal Vpk indicates the first output voltage Vout1.

The compensation circuit 242 receives the sample and hold signal Vpk and generates a compensation signal based on the sample and hold signal Vpk. In the embodiment shown in FIG. 9, the compensation circuit 242 includes a current source IS1 for providing a current proportional to the sample and hold signal Vpk. The current flows through a resistor Rcs1 coupled to the pin CS to generate the compensation signal.

The switching control signal generating circuit 240 provides the switching control signal CTRL to control the power switch M2 of the post-stage circuit 21 based on the compensation signal. In the embodiment of FIG. 9, the switching control signal generating circuit 240 includes a fourth comparing circuit 243, a modulating signal generating circuit 244, an error amplifying circuit 245, a fifth comparing circuit 246 and a logic circuit 247.

The fourth comparing circuit 243 has a first input terminal, a second input terminal and an output terminal. The first input terminal receives an addition signal Vad obtained by performing addition on the current sense signal Vcs and the compensation signal. The second input terminal receives a fourth threshold voltage Vth4. The fourth comparing circuit 243 compares the addition signal Vad with the fourth threshold voltage Vth4 to generate a fourth comparison signal CA4 at the output terminal to control the turning off of the power switch M2. In one embodiment, the fourth comparing circuit 243 includes a comparator CMP4.

The modulating signal generating circuit 244 generates a modulating signal VM. The modulating signal VM may be a saw tooth signal, a triangular signal or other suitable signals.

The error amplifying circuit 245 has a first input terminal, a second input terminal and an output terminal. The first input terminal receives a feedback voltage signal VFB indicating the second output signal Vout2. The second input terminal receives a reference voltage signal VREF. The error amplifying circuit 245 generates an error amplifying signal VCOMP at the output terminal based on a difference between the reference voltage signal VREF and the feedback voltage signal VFB.

The fifth comparing circuit 246 has a first input terminal, a second input terminal and an output terminal. The first input terminal receives the modulating signal VM. The second input terminal receives the error amplifying signal VCOMP. The fifth comparing circuit 246 compares the modulating signal VM with the error amplifying signal VCOMP and generates a pulse frequency modulating signal PFM at the output terminal to control the turning on of the power switch M2. In one embodiment, the fifth comparing circuit 246 includes a comparator CMP5.

The logic circuit 247 has a first input terminal, a second input terminal and an output terminal. The first input terminal receives the fourth comparison signal CA4. The second input terminal receives the pulse frequency modulating signal PFM. The logic circuit 247 provides the switching control signal CTRL based on the fourth comparison signal CA4 and the pulse frequency modulating signal PFM to control the power switch M2. In one embodiment, the logic circuit 247 includes a RS flip-flop FF2.

Persons skilled in the art should be understood that the switching control circuit 24B shown in FIG. 9 is just for illustration purpose and is not intended to limit the present invention, other suitable switching control circuits may be included within the spirit and scope of the present invention.

Figure 10:
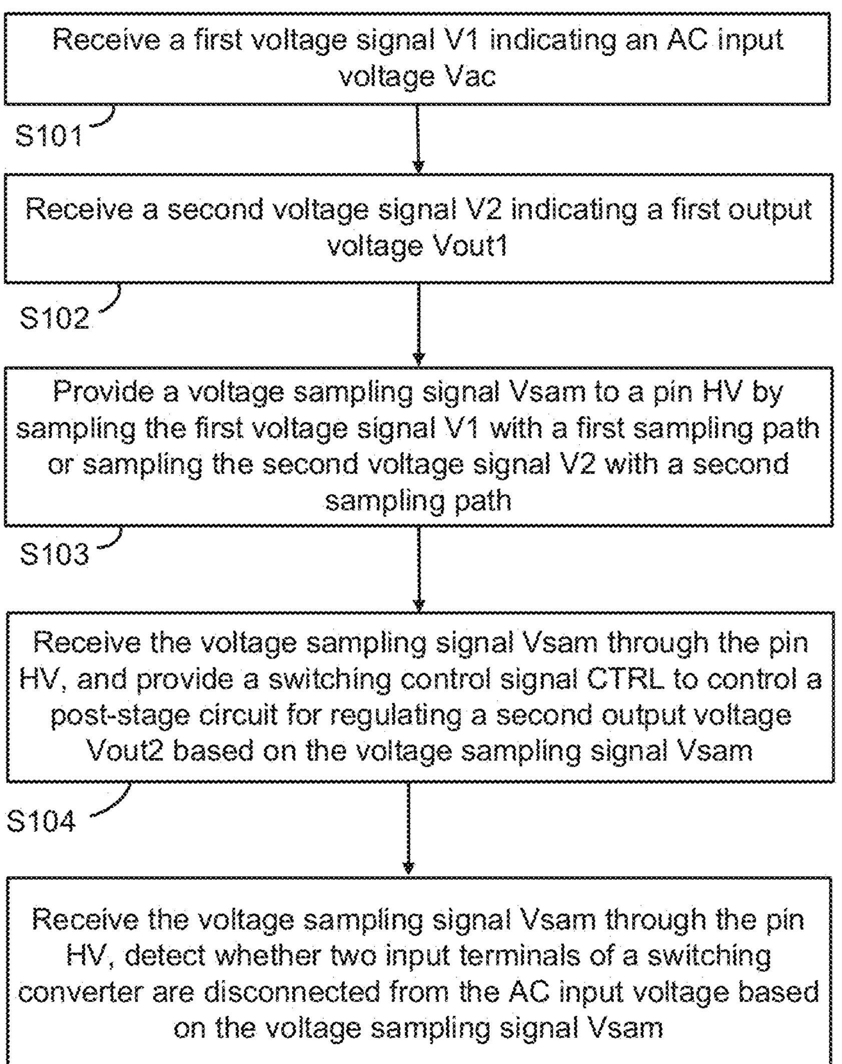
FIG. 10 shows a flow diagram of a control method 1000 for a switching converter in accordance with an embodiment of the present invention.

FIG. 10 shows a flow diagram of a control method 1000 for a switching converter in accordance with an embodiment of the present invention. The switching converter has a pre-stage circuit and a post-stage circuit. The pre-stage circuit converts an AC input voltage Vac to a first output voltage Vout1. The post-stage circuit converts the first output voltage Vout1 to a second output voltage Vout2. The switching converter further includes a pin HV. The control method 1000 includes steps S101~S105.

At step S101, a first voltage signal V1 indicating the AC input voltage Vac is received.

At step S102, a second voltage signal V2 indicating the first output voltage Vout1 is received.

At step S103, a voltage sampling signal Vsam is provided to the pin HV by sampling the first voltage signal V1 with a first sampling path or sampling the second voltage signal V2 with a second sampling path. In one embodiment, the voltage sampling signal Vsam is provided based on the first voltage signal V1 or the second voltage signal V2 by comparing a difference between the second voltage signal V2 and the first voltage signal V1 with a threshold voltage Vth. In a further embodiment, when the difference between the second voltage signal V2 and the first voltage signal V1 is higher than the threshold voltage Vth, the voltage sampling signal Vsam is provided by sampling the second voltage signal V2 with the second sampling path. Otherwise, the voltage sampling signal Vsam is provided by sampling the first voltage signal V1 with the first sampling path.

At step S104, the voltage sampling signal Vsam is received through the pin HV, and a switching control signal CTRL is provided to control the post-stage circuit for regulating the second output voltage Vout2 based on the voltage sampling signal Vsam.

At step S105, the voltage sampling signal Vsam is received through the pin HV, whether two input terminals of the switching converter are disconnected from the AC input voltage is detected based on the voltage sampling signal Vsam. In a further embodiment, whether to perform a discharge operation on a safety capacitor XCAP coupled between the two input terminals of the switching converter is determined based on the detection. In one embodiment, the safety capacitor XCAP is discharged through a current source to provide a power supply voltage Vcc when the two input terminals of the switching converter are disconnected from the AC input voltage.

The steps S101~S105 could be performed in different orders.

It should be understood, the circuit and the workflow described in the present invention are just for schematic illustration. Any circuit can realize the function and operation of the present invention does not depart from the spirit and the scope of the invention.

While specific embodiments of the present invention have been provided, it is to be understood that these embodiments are for illustration purposes and not limiting. Since the invention can be practiced in various forms without distracting the spirit or the substance of the invention. It should be appreciated that the above embodiments are not confined to any aforementioned specific detail but should be explanatory broadly within the spirit and scope limited by the appended claims. Thus, all the variations and modification falling into the scope of the claims and their equivalents should be covered by the appended claims.

What is claimed is:

1. An integrated circuit control device for a switching converter with a pre-stage circuit for converting an AC input voltage to a first output voltage and a post-stage circuit for converting the first output voltage to a second output voltage, the integrated circuit control device comprising:
- a first pin configured to receive a voltage sampling signal, wherein the first pin is configured to be coupled to a first sampling path sampling a first voltage signal indicating the AC input voltage, and configured to be coupled to a second sampling path sampling a second voltage signal indicating the first output voltage;
- a discharge circuit configured to receive the voltage sampling signal through the first pin, and to detect whether two input terminals of the switching converter are disconnected from the AC input voltage based on the voltage sampling signal; and
- a switching control circuit configured to receive the voltage sampling signal through the first pin, and to provide a switching control signal to control the post-stage circuit for regulating the second output voltage based on the voltage sampling signal.

2. The integrated circuit control device of claim 1, wherein:
- the voltage sampling signal is provided based on the first voltage signal or the second voltage signal by comparing a difference between the second voltage signal and the first voltage signal with a threshold voltage.

3. The integrated circuit control device of claim 2, wherein:
- when the difference between the second voltage signal and the first voltage signal is lower than the threshold voltage, the voltage sampling signal is provided by sampling the first voltage signal with the first sampling path; and
- when the difference between the second voltage signal and the first voltage signal is higher than the threshold voltage, the voltage sampling signal is provided by sampling the second voltage signal with the second sampling path.

4. The integrated circuit control device of claim 1, wherein the first sampling path comprises:
- a first unidirectional device having an input terminal and an output terminal, wherein the input terminal is configured to receive the first voltage signal, the output terminal is configured to be coupled to the first pin.

5. The integrated circuit control device of claim 1, wherein the second sampling path comprises:
- a second unidirectional device having an input terminal and an output terminal, wherein the input terminal is configured to receive the second voltage signal; and
- a voltage dependent resistor having a first terminal and a second terminal, wherein the first terminal is configured to be coupled to the output terminal of the second unidirectional device, the second terminal is configured to be coupled to the first pin.

6. The integrated circuit control device of claim 1, wherein the discharge circuit is further configured to determine whether to perform a discharge operation on a safety capacitor coupled between the two input terminals of the switching converter.

7. The integrated circuit control device of claim 6, wherein the discharge circuit comprises:
- a detecting circuit configured to detect whether the two input terminals of the switching converter are disconnected from the AC input voltage based on the voltage sampling signal and to generate a flag signal; and
- a current source having a first terminal and a second terminal, wherein the first terminal is configured to be coupled to the safety capacitor through the first pin, the second terminal is configured to be coupled to a power supply capacitor; and wherein
- when the flag signal indicates that the two input terminals of the switching converter are disconnected from the AC input voltage, energy stored in the safety capacitor is transferred to the power supply capacitor through the current source.

8. The integrated circuit control device of claim 1, wherein the switching control circuit comprises:
- a sample and hold circuit configured to receive the voltage sampling signal and to provide a sample and hold signal based on a peak value of the voltage sampling signal;
- a compensation circuit configured to generate a compensation signal based on the sample and hold signal; and
- a switching control signal generating circuit configured to provide the switching control signal to control a power switch of the post-stage circuit based on the compensation signal.

9. The integrated circuit control device of claim 1, wherein a peak value of the second voltage signal indicates the first output voltage.

10. A switching converter, comprising:
- a pre-stage circuit configured to receive an AC input voltage and to convert the AC input voltage to a first output voltage;
- a post-stage circuit configured to receive the first output voltage and to convert the first output voltage to a second output voltage; and an integrated circuit control device, comprising:

a first pin configured to receive a voltage sampling signal, wherein the first pin is configured to be coupled to a first sampling path sampling a first voltage signal indicating the AC input voltage, and configured to be coupled to a second sampling path sampling a second voltage signal indicating the first output voltage;

a discharge circuit configured to receive the voltage sampling signal through the first pin, and to detect whether two input terminals of the switching converter are disconnected from the AC input voltage based on the voltage sampling signal; and a switching control circuit configured to receive the voltage sampling signal through the first pin and to provide a switching control signal to control the post-stage circuit for regulating the second output voltage based on the voltage sampling signal.

11. The switching converter of claim 10, wherein:

the voltage sampling signal is provided based on the first voltage signal or the second voltage signal by comparing a difference between the second voltage signal and the first voltage signal with a threshold voltage.

12. The switching converter of claim 11, wherein:

when the difference between the second voltage signal and the first voltage signal is lower than the threshold voltage, the voltage sampling signal is provided by sampling the first voltage signal with the first sampling path; and when the difference between the second voltage signal and the first voltage signal is higher than the threshold voltage, the voltage sampling signal is provided by sampling the second voltage signal with the second sampling path.

13. The switching converter of claim 10, wherein the first sampling path comprises:

a first unidirectional device having an input terminal and an output terminal, wherein the input terminal is configured to receive the first voltage signal, the output terminal is configured to be coupled to the first pin.

14. The switching converter of claim 10, wherein the second sampling path comprises:

a second unidirectional device having an input terminal and an output terminal, wherein the input terminal is configured to receive the second voltage signal; and a voltage dependent resistor having a first terminal and a second terminal, wherein the first terminal is configured to be coupled to the output terminal of the second unidirectional device, the second terminal is configured to be coupled to the first pin.

15. The switching converter of claim 10, wherein the discharge circuit is further configured to determine whether to perform a discharge operation on a safety capacitor coupled between the two input terminals of the switching converter.

16. The switching converter of claim 15, wherein the discharge circuit comprises:

a detecting circuit configured to detect whether the two input terminals of the switching converter are disconnected from the AC input voltage based on the voltage sampling signal and to generate a flag signal; and a current source having a first terminal and a second terminal, wherein the first terminal is configured to be coupled to the safety capacitor through the first pin, the second terminal is configured to be coupled to a power supply capacitor; and wherein when the flag signal indicates that the two input terminals of the switching converter are disconnected from the AC input voltage, energy stored in the safety capacitor is transferred to the power supply capacitor through the current source.

17. The switching converter of claim 10, wherein the switching control circuit comprises:

a sample and hold circuit configured to receive the voltage sampling signal and to provide a sample and hold signal based on a peak value of the voltage sampling signal;

a compensation circuit configured to generate a compensation signal based on the sample and hold signal; and a switching control signal generating circuit configured to provide the switching control signal to control a power switch of the post-stage circuit based on the compensation signal.

18. A control method for a switching converter with a pre-stage circuit for converting an AC input voltage to a first output voltage and a post-stage circuit for converting the first output voltage to a second output voltage, comprising:

receiving a first voltage signal indicating the AC input voltage;

receiving a second voltage signal indicating the first output voltage;

providing a voltage sampling signal to a first pin by sampling the first voltage signal with a first sampling path or sampling the second voltage signal with a second sampling path;

receiving the voltage sampling signal through the first pin and providing a switching control signal to control the post-stage circuit for regulating the second output voltage based on the voltage sampling signal; and receiving the voltage sampling signal through the first pin and detecting whether two input terminals of the switching converter are disconnected from the AC input voltage based on the voltage sampling signal.

19. The control method of claim 18, wherein:

providing the voltage sampling signal by sampling the first voltage signal with the first sampling path when a difference between the second voltage signal and the first voltage signal is lower than a threshold voltage; and providing the voltage sampling signal by sampling the second voltage signal with the second sampling path when the difference between the second voltage signal and the first voltage signal is higher than the threshold voltage.

20. The control method of claim 18, further comprising:

determining whether to perform a discharge operation on a safety capacitor coupled between the two input terminals of the switching converter.

* * * * *